(12) United States Patent
Banerjee et al.

(10) Patent No.: US 8,578,040 B2
(45) Date of Patent: Nov. 5, 2013

(54) METHOD, SYSTEM AND ARTICLE FOR CLIENT APPLICATION CONTROL OF NETWORK TRANSMISSION LOSS TOLERANCE

(75) Inventors: Dwip N. Banerjee, Austin, TX (US); Kavitha Vittal Murthy Baratakke, Austin, TX (US); Ketan Priyakant Pancholi, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 3359 days.

(21) Appl. No.: 10/640,847

(22) Filed: Aug. 14, 2003

(65) Prior Publication Data
US 2005/0038899 A1 Feb. 17, 2005

(51) Int. Cl.
*G06F 15/16* (2006.01)
(52) U.S. Cl.
USPC .......................................................... 709/231
(58) Field of Classification Search
USPC .......................................................... 709/231
See application file for complete search history.

(56) References Cited

U.S. PATENT DOCUMENTS

| | | | |
|---|---|---|---|
| 6,438,603 B1 | 8/2002 | Ogus | |
| 6,643,259 B1 * | 11/2003 | Borella et al. | 370/231 |
| 6,912,575 B1 * | 6/2005 | Swift et al. | 709/226 |
| 2003/0067877 A1 * | 4/2003 | Sivakumar et al. | 370/232 |

* cited by examiner

*Primary Examiner* — Scott Christensen
(74) *Attorney, Agent, or Firm* — Yudell Isidore Ng Russell PLLC

(57) ABSTRACT

A dynamically-enforceable application-controlled quasi-reliable extension to TCP permits a client application to dynamically set a percent loss tolerance for data transmission reliability through network input/output system calls to the TCP, thereby programming the transport layer to optimistically acknowledge non-critical missing frames. The reliability requirement can be dynamically set within TCP to the level of reliability required for specific data frames within the data stream during the data transfer. Based on this loss tolerance specified, the TCP layer makes a determination whether to trigger a retransmission or continue delivering out-of-order frames to the application. A forced acknowledgement frame is sent for each missing packet until the number missing packets causing forced acknowledgments within the current receive buffer frame exceeds the loss tolerance. This process avoids needless retransmissions and permits the TCP data flow and sliding window to advance uninterrupted, thereby providing substantial performance benefits to network throughput.

6 Claims, 7 Drawing Sheets

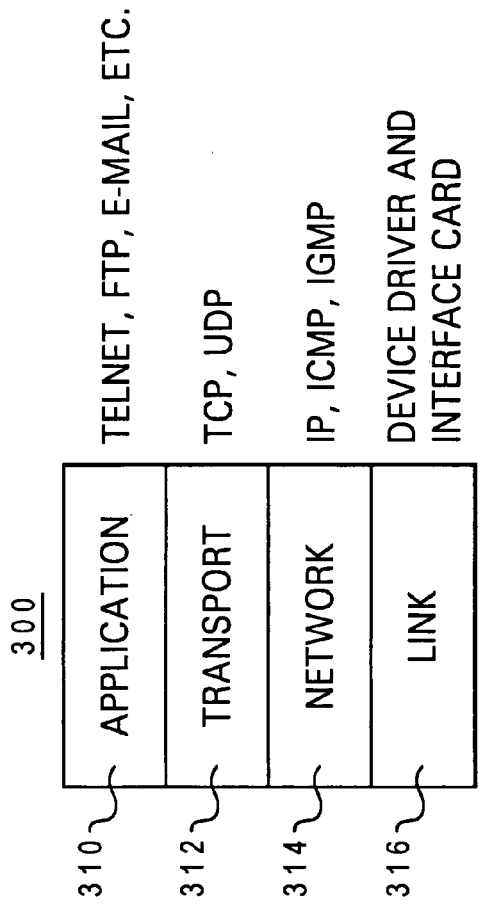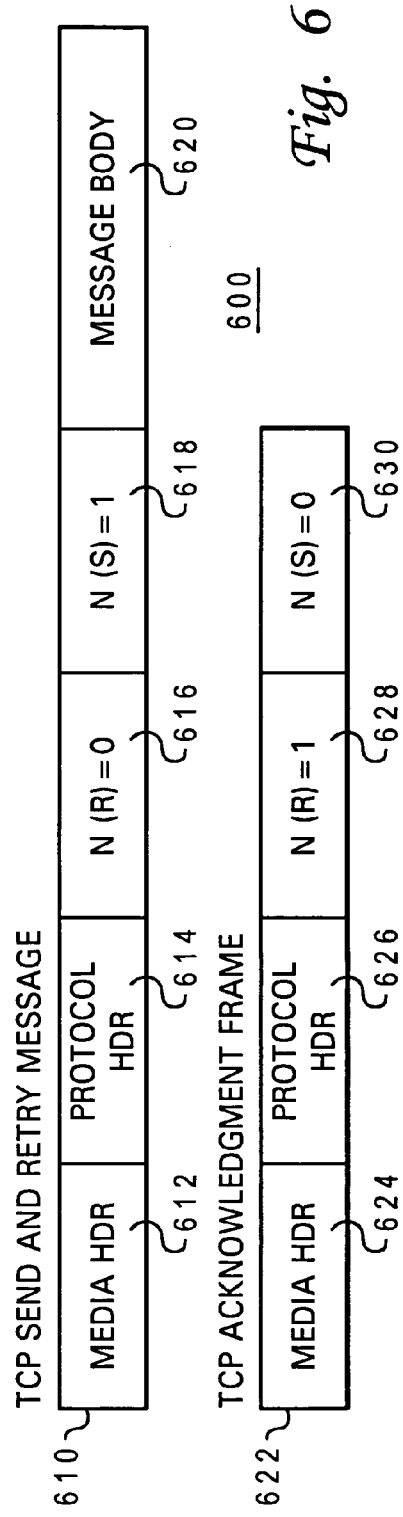

METHOD, SYSTEM AND ARTICLE FOR CLIENT APPLICATION CONTROL OF NETWORK TRANSMISSION LOSS TOLERANCE

TECHNICAL FIELD

The present invention relates generally to data transfers in data processing system networks and in particular to transfer of data blocks over the Internet or similar networks. Still more particularly, the present invention relates to implementing application-controlled, dynamic, quasi-reliable data transmission functionality for improved performance of data transfer over a network such as the Internet.

BACKGROUND

The Internet has become an important conduit for transmission and distribution of data (text, code, image, video, audio, or mixed) and software. Users connect to the backbone with broadly divergent levels of performance, ranging from 14.4 Kb/s to more than 45 Mb/s. Moreover, Transmission Control Protocol/Internet Protocol (TCP/IP) has become a widely implemented standard communication protocol in Internet/Intranet technology, enabling broad heterogeneity between clients, servers, and the communications systems coupling them. Internet Protocol (IP) is the network layer protocol and Transmission Control Protocol (TCP) is the transport layer protocol. At the network level, IP provides a "datagram" delivery service. By contrast, TCP builds a transport level service over the datagram service to provide guaranteed, sequential delivery of a byte stream between two IP hosts.

TCP flow control mechanisms operate exclusively at the end stations to limit the rate at which TCP endpoints emit data. However, TCP lacks explicit data rate control. The basic flow control mechanism is a "sliding window", superimposed on a range of bytes beyond the last explicitly acknowledged byte. The sliding window limits the maximum number of sequential bytes between the byte most recently sent from the server to the earliest byte for which a receipt acknowledgment has not yet been received from the client. This sliding operation limits the amount of unacknowledged transmissible data that a TCP endpoint can emit. A variety of algorithms automatically re-send packets and slowly restart data transmission when the sliding window limit is exceeded. Thus, if the link between the server and client is shut down in the middle of transmission of a data collection, the server will stop sending packets within one sliding window of the last packet acknowledged by the client. This use of a sliding window inherently limits the bandwidth of a data transfer through the network.

TCP/IP is a connection-oriented reliable communications protocol that strictly enforces reliable data transfer such that loss of a single TCP frame can block delivery of all subsequent data in the TCP stream until the lost TCP frame is delivered. However, not all client applications require the strict sequence and reliable delivery provided by TCP, especially since this service comes at a cost to bandwidth. For example, video or image based applications do not require strictly reliable data delivery. In such applications, if certain parts of the data stream are lost, the video/image can still be rendered effectively. Thus, the application is willing to tolerate some data loss in some cases if performance can be improved overall. However, TCP will automatically decrease bandwidth available to the application as it enforces the strict reliability.

One approach to avoid the strict reliability requirements of TCP is utilization of an unreliable transport such as User Datagram Protocol (UDP). UDP is a protocol, which defines a connectionless datagram service. A transport layer process or system implementing UDP may produce self-contained data packets, which include destination routing information. To use this approach, client applications must implement their own partial-reliability in layers above the UDP transport layer. However, an application's use of its own partial-reliability layer on top of the UDP transport layer tends to make the application very complex since it must insert its own headers in packets to order and sequence the packets.

Another approach has been to use a protocol like Stream Control Transmission Protocol (SCTP) that provides both a reliable and a partially-reliable data stream within the same connection. However, using SCTP involves changing both the server and the client-side applications to accommodate this unique protocol. Such a change to the server and client-side applications involves rewriting entire applications, which is not economical or always feasible.

It can be seen that there is a need for a communications protocol that provides quasi-reliable data transport, but that reduces the cost and complexity seen in previous solutions. It would be preferable for such a protocol to be easily incorporated into existing networks and to be dynamically controlled based on the data transfer reliability requirements of the client application.

SUMMARY OF THE INVENTION

In accordance with the present invention, improved methods, systems and articles of manufacture for managing transport of a data stream over a communication link for an application of a data processing system are disclosed. In one preferred method of the present invention, a loss tolerance for a data packet of a plurality of data packets being received over the communication link is specified, wherein loss tolerance is a maximum percent of the plurality of data packets that is permitted to be not received over the communication link for purposes of the application; when an indication is received that the data packet was not received over the communication link; it is determined if a number of data packets of the plurality of data packets not received over the communications link has exceeded the loss tolerance specified for the data packet. If the number of data packets of the plurality of data packets not received over the communications link has not exceeded the loss tolerance specified for the data packet, an acknowledgement is sent indicating that the data packet has been received by the data processing system. If the number of data packets of the plurality of data packets not received over the communications link has exceeded the loss tolerance specified for the data packet, an acknowledgement is sent indicating that the data packet has not been received by the data processing system.

All objects, features, and advantages of the present invention will become apparent in the following detailed written description.

BRIEF DESCRIPTION OF THE DRAWINGS

FIG. 3 shows an example of a 4-layer communications architecture utilizing TCP/IP.

FIG. 6 shows the data structure of a TCP send or retry frame and a TCP acknowledge frame.

DETAILED DESCRIPTION OF PREFERRED EMBODIMENTS

This invention is described in a preferred embodiment in the following description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention.

Figure 1:
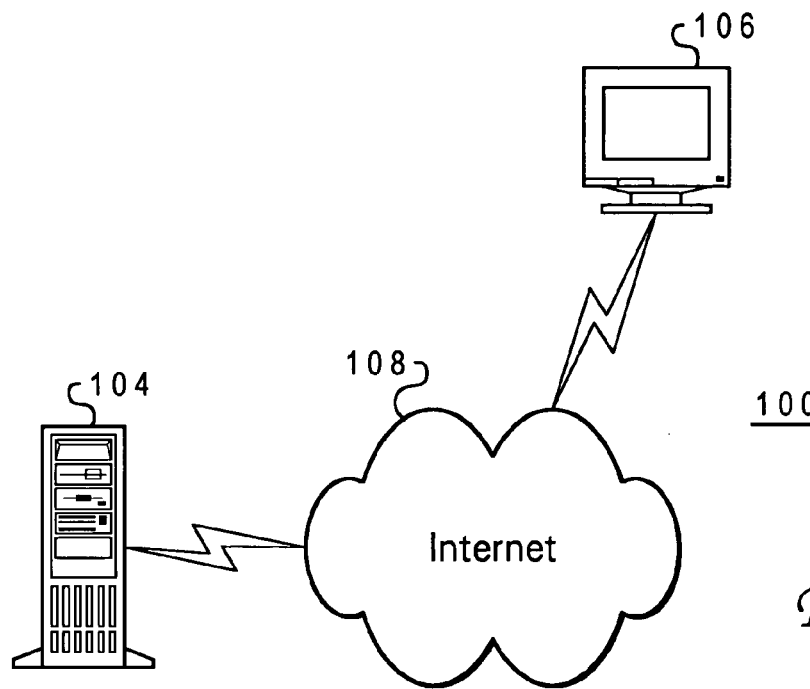
FIG. 1 a data processing system network in which a preferred embodiment of the present invention may be implemented is depicted.

With reference now to the figures, and in particular with reference to FIG. 1, a data processing system network in which a preferred embodiment of the present invention may be implemented is depicted. Data processing system network 100 includes at least one server system 104 coupled to at least one client system 106 via at least one network such as the Internet 108. Data transfers between the server system 104 and client system 106 conform to the TCP/IP specification, as well as File Transfer Protocol (FTP), HyperText Transfer Protocol (HTTP), or some similar communications protocol. Large data transfers are performed in parallel frames as described in further detail below. As will be appreciated, while only a single server system 104 and single client system 106 are shown, data processing system network 100 may include any number of server and client systems (not shown) interconnected by one or more connections and networks, including Internet 108.

Figure 2:
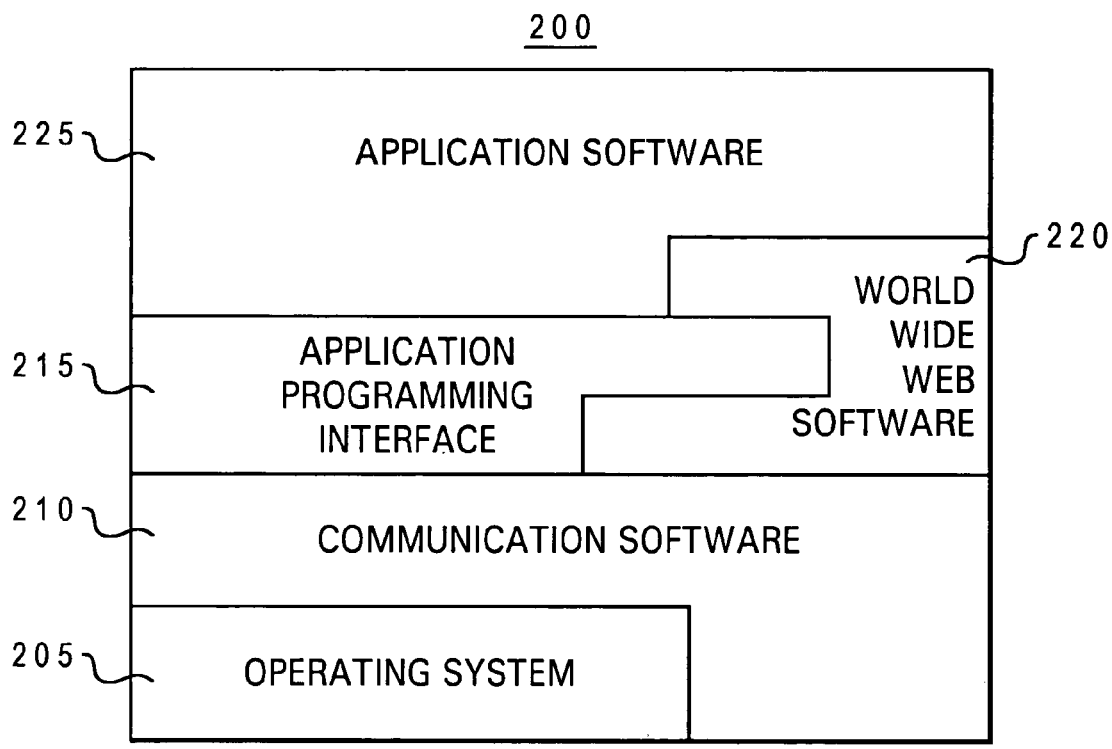
FIG. 2 is a depiction of a typical software architecture for a world wide web server-client system, as may be utilized in a preferred embodiment of the present invention.

FIG. 2 is a depiction of a typical software architecture for a world wide web server-client system, as may be utilized in a preferred embodiment of the present invention. Server 104 and client 106 are each architected with software architecture 200. At the lowest level, an operating system 205 is utilized to provide high-level functionality to the user and to other software. Such an operating system typically includes a BIOS (Basic Input Output System). Communication software 210 provides communications through an external port to a network such as the Internet via a physical communication link by either directly invoking operating system functionality or indirectly, bypassing the operating system to access the hardware for communications over the network. The application programming interface 215 allows the user of the system, be it an individual or a software routine, to invoke system capabilities using a standard consistent interface without concern for how the particular functionality is implemented. The world wide web software 220 represents any one of several standard commercial packages available for equipping a computer with world wide web functionality. The application software 225 represents any number of software applications designed to react to data through the communications port to provide the desired functionality the user seeks. Applications at this level may include those necessary to handle data, video, graphics, photos or text, which can be accessed by users of the world wide web. In a preferred embodiment, data transmission "loss tolerance" (as defined herein) is controlled by the application software 225 running in the client system. However, it will be understood by those skilled in the art that the invention may be implemented in the firmware, software or circuitry of any hardware in the client 106.

In order to transfer data over a network, it is necessary to have a set of rules so that every portion of the transfer sequence is properly executed. Each of these rules is called a protocol, and a set of rules is called a protocol suite. The most common set of protocols that are used when transferring data over the Internet and various other networks such as LANs (local area networks) and WANs (wide area networks) is provided by the TCP/IP (Transmission Control Protocol/Internet Protocol) protocol suite. The TCP/IP protocol suite allows a variety of different types of computers, running different operating systems, to communicate with each other. TCP/IP forms the basis for the worldwide Internet, a wide area network of more than one million computers that literally spans the globe. There are many other network protocol suites in addition to the TCP/IP suite, including IPX/SPX (Internet Packet Exchange/Sequenced Packet Exchange), and NetBios. Although originally developed by independent research groups, most network protocols are open (non-proprietary) standards, many of which are published as a series of numerically-ordered RFC (Request for Comment) papers. For example the IP protocol is RFC 791. The RFC papers are readily available on the Internet or at various libraries.

Although distinct, each of these network protocol suites are similar in structure, comprising a set of layers, with each layer responsible for a different facet of the communication task. For simplicity, the discussion below will primarily pertain to the use of the invention when using the TCP/IP protocol. However, it should be recognized by those skilled in the art that although the principles of the invention are described in reference to the TCP/IP protocol, the invention can also be applied to various other network protocols as well.

As shown in FIG. 3, TCP/IP and similar protocols are utilized by a 4-layer communications architecture 300 overlaying the software architecture 200 within the server 104 and client 106, and comprising an application layer 310, a transport layer 312 a network layer 314, and a link layer 316. Each layer is responsible for handling various communications tasks, as follows. The link layer 316 (also referred to as the data-link layer or the network interface layer) normally includes the device driver in the operating system and the corresponding network interface card in the computer. Together they handle all the hardware details of physically interfacing with the network media being used, e.g. Ethernet cable, etc. The network layer 314 (also referred to as the internet layer) handles the movement of packets of data around the network. For example, the network layer handles the routing of the various packets of data that are transferred over the network. The network layer in the TCP/IP suite is comprised of several protocols, including IP (Internet Protocol), ICMP (Internet Control Message Protocol), and IGMP (Internet Group Management Protocol).

The transport layer 312 provides an interface between the network layer 314 and the application layer 310 that facilitates the transfer of data between two host computers. In the TCP/IP protocol suite there are two distinctly different transport protocols: TCP (Transmission Control Protocol) and UDP (User Datagram Protocol). It is concerned with things such as dividing the data passed to it from the application into appropriately sized chunks for the network layer below, acknowledging received packets, setting timeouts to make certain the other end acknowledges packets that are sent, etc. In accordance with the present invention, when using TCP, the application layer in the client sets the reliability requirements to be met by the transport layer. Conversely, UDP provides a much simpler service to the application layer. It merely sends packets of data called datagrams from one host to the other, without providing any mechanism for guaranteeing that the data is properly transferred. The reliability functionality must be performed by the application layer when using UDP.

The application layer 310 handles the details of the particular application. There are many common TCP/IP applications that almost every implementation provides, including (1) Telnet for remote login; (2) FTP, the File Transfer Protocol; (3) SMTP, the Simple Mail Transfer protocol, for electronic mail, and (4) SNMP, the Simple Network Management Protocol.

Computer networks have developed from simple LANs comprising a handful of computers to complex WANs comprising a network of networked computers. The first computer networks were motivated by the realization that it would be advantageous to provide communication links between stand-alone computers. The concepts used in these original networks have fueled the development of today's internets, which comprise a network of networks that use the same protocol suite. Such internets allow a computer on one network to communicate with any one or more computers on the other networks, allowing the data across all of the computers comprising all of the networks to be shared.

Figure 4:
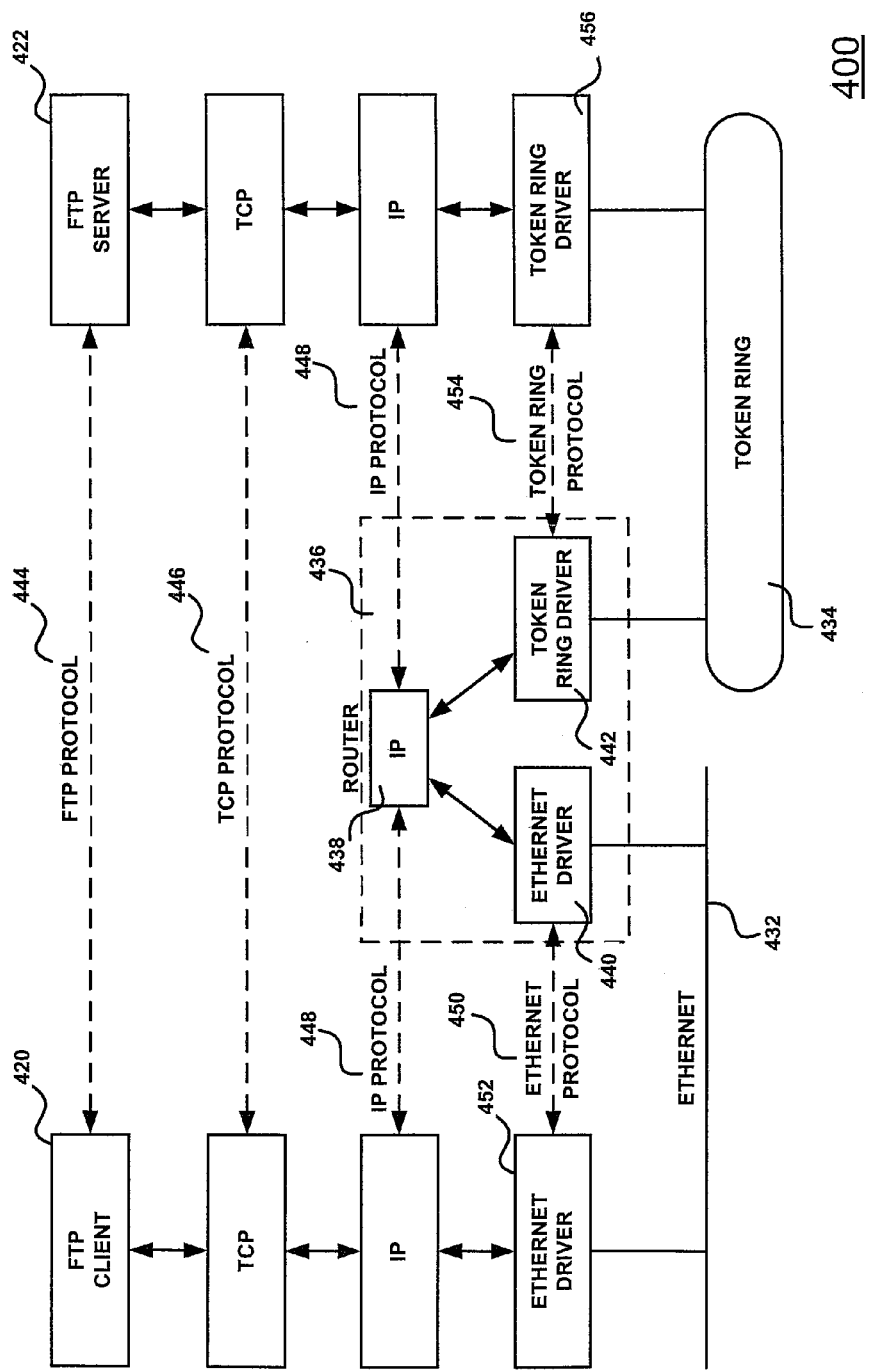
FIG. 4 shows an example of an internet comprising an Ethernet network connected to a token ring network by a router.

The easiest way to build an internet is to connect two or more networks together with a router. Typical routers comprise a special-purpose hardware box with input and output connections and dedicated hardware and/or embedded software that allow many different types of physical networks to be connected, such as Ethernet, token ring, point-to-point links, etc. FIG. 4 shows an internet comprising an Ethernet network 432 connected to a token ring network 434 by a router 436. Although FIG. 4 only shows two hosts in communication, any host on the Ethernet network can communicate with any host on the token ring network. The router 436 comprises a network layer module 438 (an IP module in this case), and appropriate network drivers for connecting to the host networks, namely an Ethernet driver 440 and a token ring driver 442.

As shown in FIG. 4, at the application layer, the network comprises an FTP client 420 and an FTP server 422. Most network applications are designed so that one end is the client and the other side is the server. The server provides some type of services to various clients, in this case, access to files on the server host. Each layer has one or more protocols for communicating with its peer at the same layer. These communication protocols include the FTP protocol 444 at the application layer, the TCP protocol 446 at the transport layer, the IP protocol 448 at the network layer, and the Ethernet protocol 450 and token ring protocol 454 at the link layer. It is common for the application layer to handle user processes, while the lower three layers (transport, network and link) are implemented in the kernel of the operating system, such as UNIX or Windows operating system. For example, the purpose of the network interface layer is to handle the details of the communication media (Ethernet, token ring, etc.), while the purpose of the application layer is to handle one specific user application (FTP, Telnet, etc.).

The application layer and the transport layer use end-to-end protocols (FTP protocol 444, TCP protocol 446). The network layer provides a hop-to-hop protocol that is used on the two end systems and every intermediate system in between (for clarity only one intermediate system is shown here). For instance, the IP module 438 of the router 436 is connected to the two hosts by IP protocols 448. There are also link layer protocols that are specific to the various types of host networks that are connected to the router to handle communication between the networks and the router at the link layer. Thus, an Ethernet protocol 450 is used to handle communications between the Ethernet driver 440 in the router 436 and the Ethernet driver 452 of the hosts on the Ethernet network 432, while a token ring protocol 454 is used to handle communications between the token ring driver 442 of the router 436 and the token ring driver 456 of the hosts on the token ring network 434.

In the TCP/IP protocol suite the network layer, IP, provides an unreliable service. It moves a packet of data from a source to a destination, but it provides no mechanism for guaranteeing delivery, or even being able to determine if a proper transfer has occurred. TCP provides reliability services to ensure that data is properly transmitted between two hosts, including dropout detection and retransmission services.

A router has two or more network interface layers (since it connects two or more networks). Any system with multiple interfaces is called multi-homed. A host can also be multi-homed, but unless it specifically forwards packets from one interface to another, it is not called a router. Also, routers need not be special hardware boxes that only move packets around an internet. Most TCP/IP implementations allow a multi-homed host to act as a router, but the host needs to be specifically configured to support this use. In such instances, the system is either a host (when an application such as FTP or Telnet is being used) or a router (when it's forwarding packets from one network to another). Another way to connect networks is with a bridge. Bridges connect networks at the link layer, while routers connect networks at the network layer. Bridges make multiple LANs appear to the upper layers as a single LAN.

One of the most powerful features of an internet is the ability to hide all the details of the physical layout of the internet from the applications. This allows the application layer to be oblivious to the underlying structure of the network; in fact, it can't and doesn't care if there is a pair of networks connected by a single router, or a multitude of routers and bridges connecting multiple physically-distinct networks.

Figure 5:
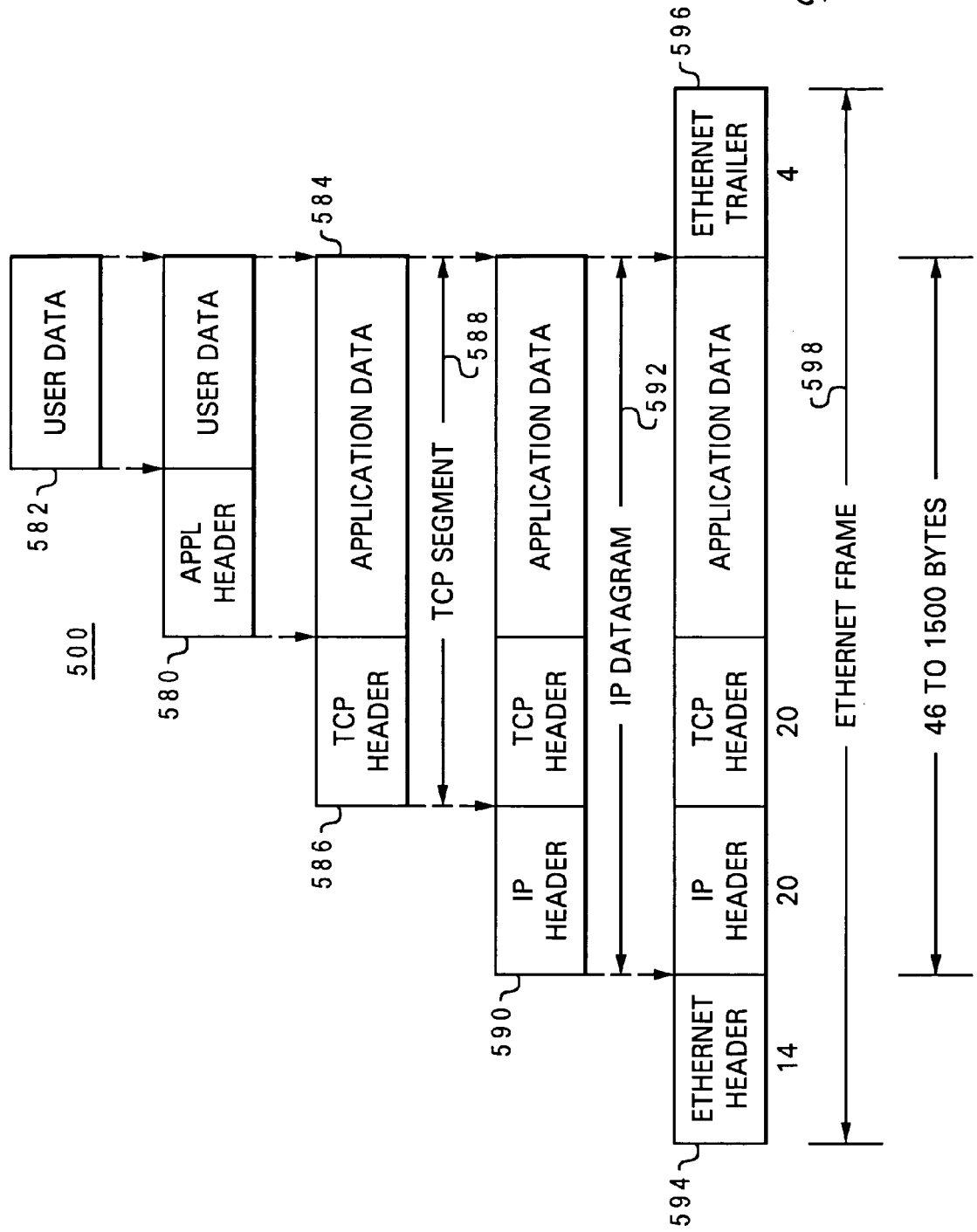
FIG. 5 shows the format of data as it traverses the TCP/IP protocol stack.

When an application sends data using TCP/IP, the data is sent down a protocol stack, through each layer, until it is sent as a stream of bits across the network. As shown in FIG. 5, each layer adds information to the data by prepending headers (and sometimes adding trailer information) to the data that it receives. For instance, at the application layer an application header 580 is prepended to user data 582 to form application data 584. At the transport layer a transport protocol header is prepended to the application data. In the case of FIG. 5 the transport layer is TCP, and therefore a TCP header 586 is prepended to the application data 584, thereby forming a TCP frame 588 that is sent to the network layer IP. The TCP header 586 comprises twenty bytes. Similarly, at the network layer, a network layer header is prepended to the transport layer data. In the case of TCP/IP, an IP header 590 is prepended to the TCP frame 588 to form an IP datagram 592. The IP header 590 also comprises twenty bytes. Finally, at the link layer a media header such as Ethernet header 594 is added to the data received from the network layer to form a frame of data. In some instances, such as when the media is Ethernet, a media trailer is also appended to the end of the data. For instance, in FIG. 5 an Ethernet trailer 596 is appended to the Ethernet Header 594 and the IP datagram 592 to form an Ethernet frame 598. The Ethernet frame comprises the stream of bits that flow across the network that correspond to the original application message data. The numbers (14, 20, 20, 4) at the bottom of the headers are typical sizes of the headers in bytes, e.g., the Ethernet header 594 comprises 14 bytes, etc. The size of the frame will be limited by the maximum transmission unit (MTU) of the type of network being used to transfer the data packet. For example, the MTU of an Ethernet network is 1500 bytes. The network layer automatically performs fragmentation (breaking the datagram up into smaller pieces), so that each fragment is smaller than the MTU of the network.

When the client detects that certain data frames are missing from the data transmission stream, the client will request that the server retransmit the missing frame by sending the sequence number of the first byte of the missing frame in the acknowledge frame. As seen in FIG. 6, the TCP send or retry message 610 typically comprises a media header 612, a protocol header 614, a received sequence number field 616, a send sequence number field 618, and a message body 620. The media header 612 will be particular to the type of network, e.g., an Ethernet header for an Ethernet network, etc. The protocol header 614 will depend on the transport and network layer protocol used, such as TCP/IP, IPX/SPX, Netbios, etc. The received sequence number field 616 provides an identifier to the last sequence number reliably received by the computer. The send sequence number 618 corresponds to the relative sequential number of the message. The message body 620 contains the application data that is being sent between the source and destination computers. The TCP acknowledge frame 622 comprises a media header 624, a protocol header 626, a received sequence number field 628, and a send sequence number field 630. These fields are analogous to the fields described above which share the same name. The acknowledge frame 622 is sent by the receiving computer to acknowledge receipt of a send or retry message. In accordance with TCP, upon receiving three consecutive acknowledge frames indicating a missing frame, the server would normally "fast retransmit" the missing frame starting with the sequence number that is missing. Such re-transmissions negatively impact performance as the server cuts back on its sliding window and reduces the amount of data it sends.

In accordance with the present invention, a dynamically enforceable application-controlled quasi-reliable extension to TCP permits a client application to dynamically set a level of data transmission reliability within TCP, thereby programming the transport layer to optimistically acknowledge non-critical missing frames. This reliability requirement can be set dynamically to the level of reliability required for specific data frames within the data stream during the data transfer. This process avoids needless retransmissions and permits the TCP data flow and sliding window to advance uninterrupted, thereby providing substantial performance benefits to network throughput.

Figure 7:
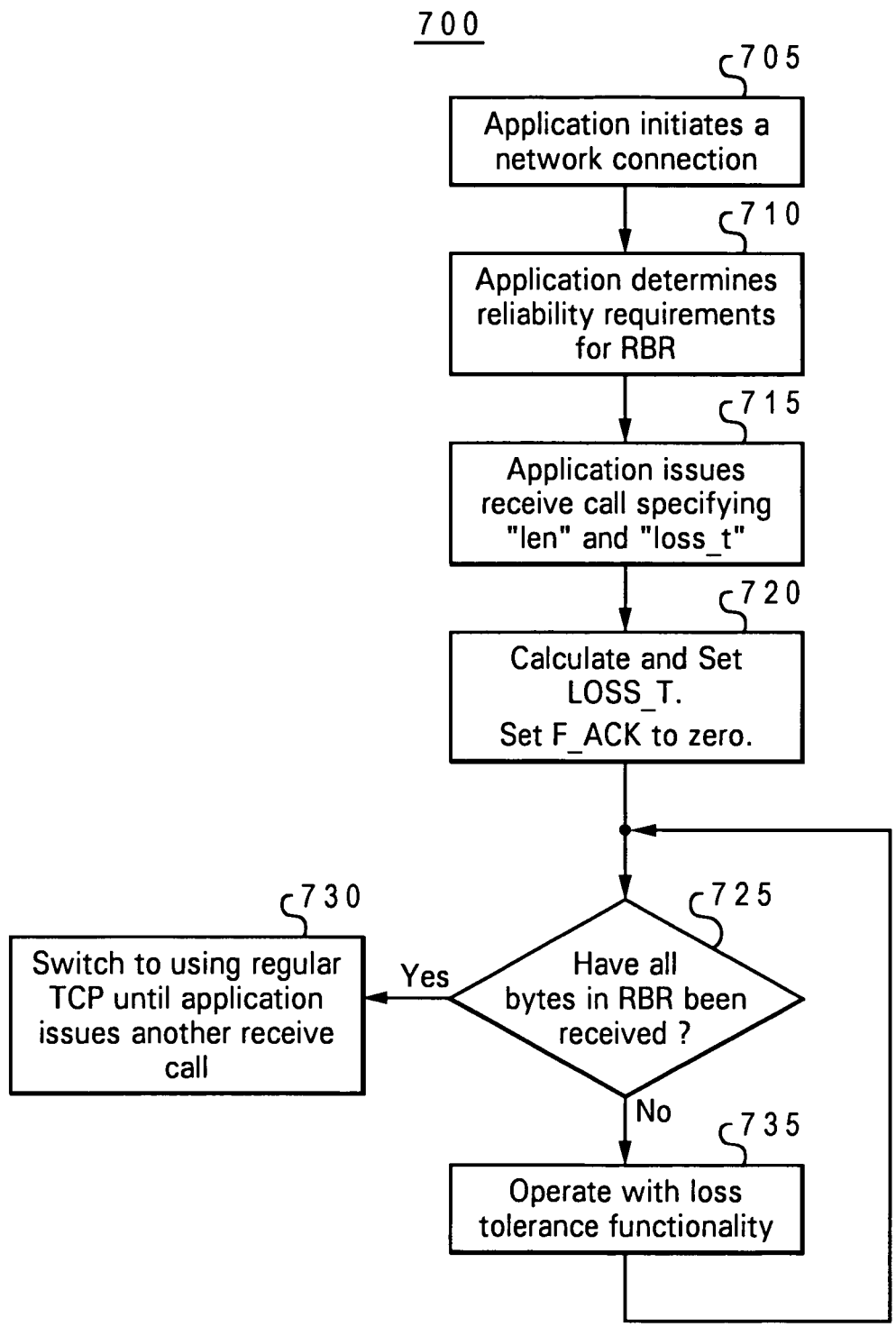
FIG. 7 shows a flow diagram of a process for setting the data transmission loss tolerance for a client application, in accordance with a preferred embodiment of the present invention.

With reference to FIG. 7, there is shown a flow diagram of a process 700 for setting the data transmission loss tolerance for a client application, in accordance with a preferred embodiment of the present invention. Process 700 begins at step 705, where an application 310 in client 106 initiates a network connection to the Internet 108 by invoking the protocol stack 300. At step 710, the client application 310 determines the data transmission reliability requirements for the particular data to be loaded in the receiver buffer (i.e., the receiver's byte range (RBR) measured by the length of the receiver buffer ("len")). The process passes to step 715, where a client application 310 having the capability to utilize the TCP extension of the present invention sets the percent loss tolerance for the present connection or data frame to be received by making a system call through network input/output system calls to the TCP layer 312. This is implemented in the client 106 with the application 310 making a system call via the "receive" ("recv") command within the application programmer's interface (API) 215. In accordance with the preferred embodiment, a new option ("loss_t") to the "receive" system call used in the BSD (Berkeley) version of UNIX Socket API System Calls is set to the percent loss tolerance that is acceptable to the present application 310. As used herein, "loss tolerance" is defined to mean the maximum percent or amount of data of a given data set that is permitted to be missing and still fulfill the data needs for purposes of the application that will consume the given data set. The percent loss tolerance would have acceptable values in the range 0-100. A loss tolerance value of "0" is equivalent to using standard, reliable TCP having zero tolerance for lost data, whereas a percent loss tolerance of 100 percent gives TCP a performance similar to UDP by never requiring a retransmission of a missing packet. The length ("len") of the receiver buffer or total length of bytes the application wants to receive at the given loss tolerance is also specified in the "recv" call. "len" is equal to the receiver's byte range (RBR), which is the number of bytes the current application is willing to receive with the specified loss tolerance ("loss_t" in the system call).

Representative formats for the "recv" system call as provided in the preferred embodiment are as follows:

```
        int recv(s, buf, len, flags, loss_t)
        int s;
        void *buf;
        int len, flags, loss_t;
where;
s       is socket descriptor
buf     is a pointer to the user (application) receive buffer
len     is the length of this receiver buffer
flags   special flags like MSG-00B (send or receive out-of-band data)
                    MSG-PEEK etc.
loss_t  is a new parameter that will be used to specify the percent loss
        tolerance of the application in the receive buffer range
```

Loss tolerance is also represented in an absolute amount of data (LOSS-T) that the present application 310 can tolerate being lost within the RBR. LOSS-T is represented in kilobytes in the preferred embodiment and is stored in the memory of client 106 accessible by transport layer 312. LOSS-T is set directly by the application 310 or is calculated by the TCP layer 312 as follows:

$$\text{LOSS\_T} = \frac{\text{loss\_t}}{100} * (\text{len}) \text{ [bytes]}$$

In a preferred embodiment, the process calculates the LOSS-T as a number of data bytes within a 15-Kbyte RBR equal to the loss_t percent.

Figure 9:
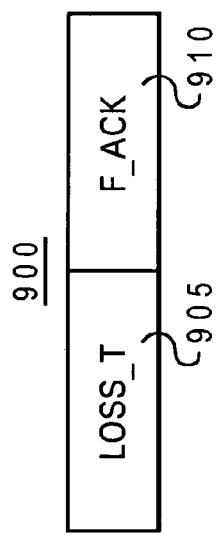
FIG. 9 is a representation of registers in the memory of a client in accordance with the present invention.

With reference back to FIG. 7, the process 700 proceeds from step 715 to decision block 720, where LOSS_T is set as a value stored in register 905 as seen in FIG. 9, and forced acknowledgments (F_ACK) (described below) is set to zero in register 910 as seen in FIG. 9. The process then passes to decision block 725 to determine if all bytes within the RBR have been received since the "recv" system call was made. If the determination is positive, the process passes to step 730, where the transport layer switches its operation to regular TCP and requests retransmission of all missing packets until the application issues a new receive system call. If the determination is negative, the process passes to step 735, where the client continues to operate its transport layer with the loss tolerance functionality of the preferred embodiment. Thereafter, the process returns to step 725 to determine if all bytes within the RBR have been received since the "recv" system call was made.

Figure 8:
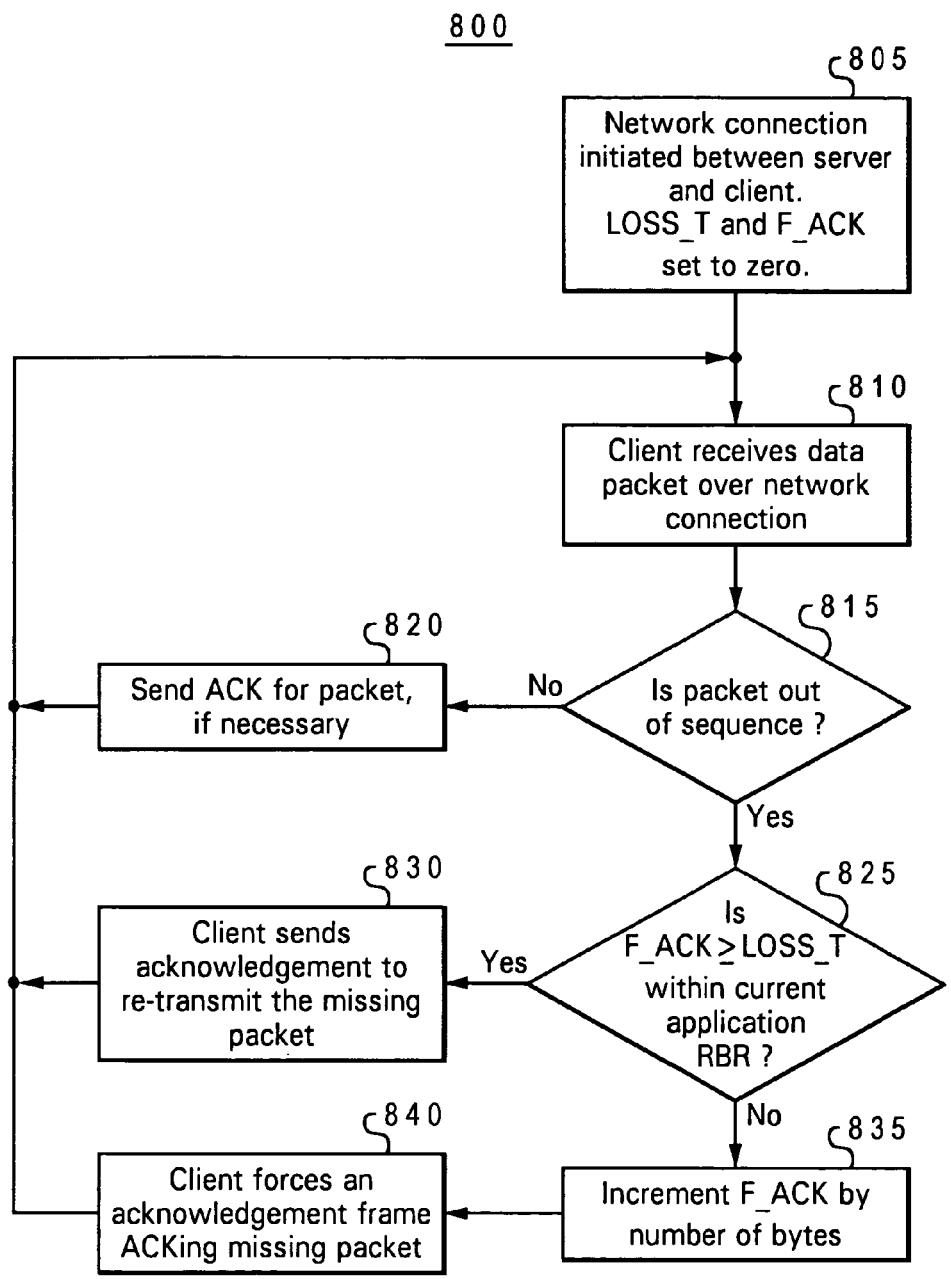
FIG. 8 shows a flow diagram of the process for implementing application-controlled, dynamic, quasi-reliable TCP functionality, in accordance with a preferred embodiment of the present invention.

With reference now to FIG. 8, there is shown a flow diagram of the process for implementing application-controlled loss tolerant TCP functionality, in accordance with a preferred embodiment of the present invention. Based on the loss tolerance specified in process 700, the TCP layer 312 makes a determination in process 800 whether to trigger a retransmission or continue delivering out-of-order frames to the application 310, depending upon whether the loss tolerance specified for the application 310 has been exceeded in a receive bytes range. The process 800 begins at step 805, when a network connection is initiated between a server and a client.

FIG. 9 is a representation of registers 900 in the memory of client 106, accessible by transport layer 312, storing process variables LOSS-T and forced acknowledgments (F-ACK) (described below). At step 805, the process variables LOSS-T and F-ACK are set to zero in registers 900. Thereafter, the process passes to step 810, when the client 106 receives a data packet over the network connection. The process then passes to decision block 815, where a determination is made whether the received data packet is out of sequence. If the data packet's sequence number is in expected order, the process passes to step 820, where an acknowledgment frame 622 is sent back to the server 104 acknowledging receipt of the data packet, if necessary. Thereafter, the process returns to step 810 to await receipt of the next data packet over the network connection.

Returning to decision block 815, if it is determined that the received data packet is out of sequence, then one or more proceeding data frames in the data stream are missing. In that case, the process passes to decision block 825, where a determination is made whether the number of missing packets causing forced acknowledgments (F-ACK) within the receive bytes range has exceeded the LOSS-T set by the client application 310 for the RBR. This is implemented by determining if F_ACK stored in register 910 is greater than or equal to the LOSS_T stored in register 905 for the current RBR. As explained, the LOSS-T is an amount of data loss that is acceptable to maintain the reliability requirements of the present application 310. If the process has forced acknowledgment of a number of kilobytes in the RBR that exceeds the present LOSS-T number or if the received packet is outside the RBR, the process passes to step 830, where the client 106 sends an acknowledgment request 610 to re-transmit the missing packets of data, which includes the sequence number of the first byte of the missing frame that it expects to be re-transmitted. The client 106 proceeds to operate as is normal for TCP by blocking delivery of all subsequent data in the TCP stream until the lost TCP frame is delivered. Thereafter, the process returns to step 810 to await receipt of the next expected data packet over the network connection.

Returning to decision block 825, if it is determined that the number of missing packets causing forced acknowledgments within the RBR has not exceeded the LOSS-T, the process passes to step 835, where F_ACK in register 910 is incremented by the number of missing bytes in the missing packets, and then the process passes to step 840, where the client 106 forces an acknowledge frame 622 to be sent to the server that indicates that the missing packets have been received by the client 106 (a "forced acknowledgement"). Thus, even though the client application 310 has not received the missing data frames, the data stream can continue to flow uninterrupted because the application 310 has received sufficient data in the RBR to meet the reliability requirements of its present application. Passing from step 835, the process returns to step 810, where the client 106 awaits receipt of a data packet over the network connection having a sequence number following the missing packets causing the forced acknowledgment.

As can now be appreciated, for applications that can tolerate a certain amount of missing data, a network client can specify a data loss tolerance that is acceptable in the current application to provide quasi-reliable TCP functionality. For example, if an application 310 has set the loss_t at 10 percent, the TCP layer 312 will acknowledge (i.e., forced acknowledgment) up to 1500 bytes of a given 15 kilobyte (Kbyte) RBR even though they have not been received. Any missing bytes in excess of the specified loss_t percent within the RBR would not be optimistically acknowledged as received, and would require that the server retransmit the missing frames. A loss_t of 100 percent would never trigger retransmission from the server, thus making TCP tolerate any amount of packet losses over the network. A loss_t of 0 percent would require TCP to operate in its strict, reliable mode of operation, providing strictly reliable data transfer, where each consecutive TCP frame must be delivered consecutively.

Figure 10:
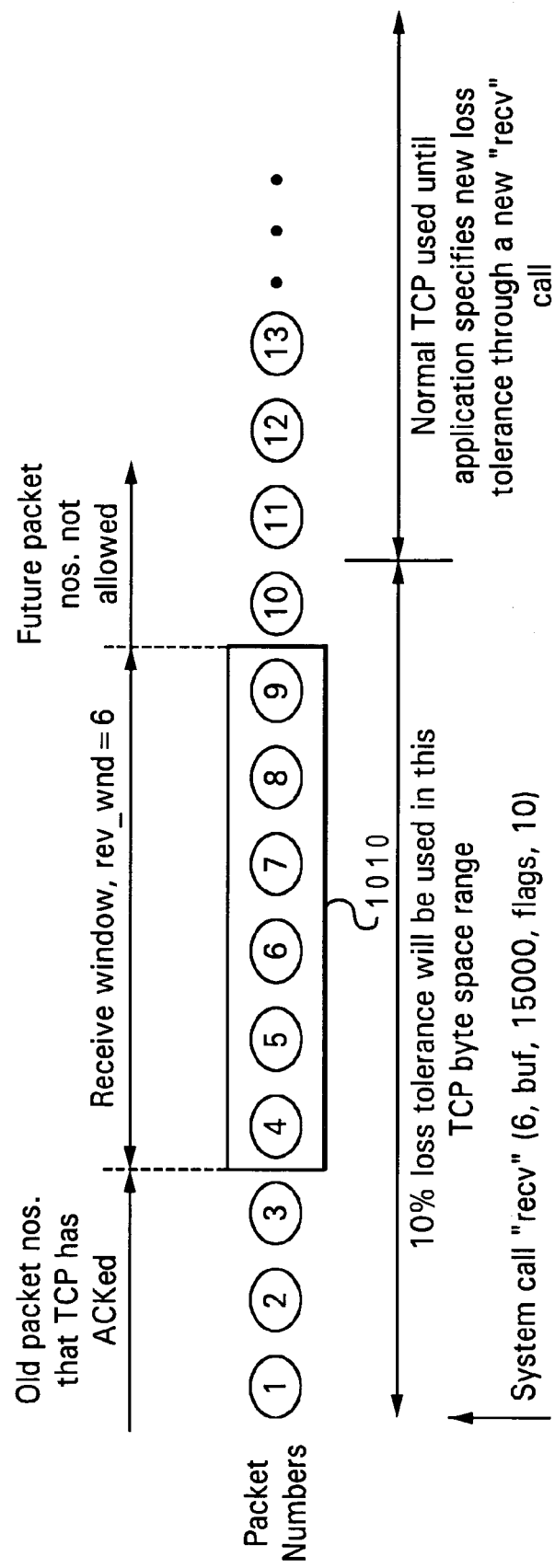
FIG. 10 is an example of the application of processes to a data stream in accordance with the present invention.

FIG. 10 is an example of the application of processes 700 and 800 to a data stream. FIG. 10 shows a data stream of thirteen packets having sequence numbers 1 to 13 identifying the packets. The application issues a system call of "recv (6, buf, 15000, flags, 10)." Thus, loss_t is set to 10% and len is set to 15 kilobytes. As shown, the sliding window 1010 is equal to six packets. Packets 1, 2 and 3 have already been acknowledged by the TCP layer. Because the RBR is 15 kilobytes and each data packet is 1500 bytes, the 10% loss tolerance set by the system call will remain in effect over the byte range of data packets 1-10. For data packets 11 and on, the system will operate with normal, reliable TCP until the application specifies a new loss tolerance through a new receive system call. As will be appreciated, if one packet of the ten packets within the RBR (i.e., 10% loss tolerance) is lost in the transmission between the sender and receiver, the receiver will force an acknowledgment of the receipt of that data packet. In the example of FIG. 10, if one of the packets within the receive window 1010 (i.e. packets 4-9) does not arrive in sequence, the client would nonetheless force an acknowledgment of its receipt. Register 910 will then be incremented by 1500, which would equal the loss tolerance of 1500 bytes set in register 905 (based on the system call 10% loss tolerance). Thereafter, if another of the segments 4-10 does not arrive at the client following the first forced acknowledgment, the TCP layer will not force acknowledgment of the missing packet, and instead will send an acknowledgment requesting retransmission of the missing packet.

It will be appreciated by those skilled in the art that the present invention provides significant advantages for improved data transmission. This process successfully prevents communication stalls resulting from unnecessary reliability requirements being enforced for a given application. Further, the process prevents congestion in the network and avoids retransmissions, thereby permitting the data flow to continue when the application can tolerate a given percent of unreliable or missing transmitted data. Still further, it can be seen that the process is implemented in the client-side, thereby preventing significant and costly changes to the server-side systems. Instead, minimal modifications to client-side applications can be programmed to dynamically determine when a given client application will utilize the loss tolerance feature simply by setting an option in the receive system call. Using standard TCP, server-side systems and client applications that are unaware of the loss tolerance feature of the present invention can operate seamlessly with client systems enabled with the present invention. Still further, the loss tolerance feature of the preferred embodiment can be dynamically controlled by applications so that specified applications, or select parts of a particular data transfer, can take advantage of the loss tolerance feature of the present invention.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

What is claimed is:

1. A machine-readable device having a computer program product for managing transport of a data stream over a communication link from a sender to a client application, said machine-readable device comprising:
    program code for establishing said communication link for receiving said data stream having one or more data packets from said sender to said client application;
    program code for dynamically determining, based on a determined reliability requirement of said client application within said communication link, a receiver loss tolerance value to be used for receiving said data stream by said client application, wherein said receiver loss tolerance value defines a second maximum number of data packets permitted to be lost over said communication link and still meets a predetermined reliability requirement without a retransmission of data packets over said communication link, wherein said receiver loss tolerance value is higher than a sender loss tolerance enforced by said sender, wherein said sender loss tolerance defines a first maximum number of data packets permitted to be lost over said communication link without a retransmission of data packets over said communication link;
    program code for determining whether or not a total number of lost data packets of said one or more data packets has exceeded said receiver loss tolerance value, wherein said determining is based on a detection of a lost data packet of said one or more data packets during a transmission of said data stream, wherein said lost data packet is a data packet not received by said client application over said communication link; and
    program code for, in response to a determination that said total number of lost data packets of said one or more data packets has not exceeded said receiver loss tolerance value, sending by said client application a first acknowledgement signal to said sender for said sender to consider that said lost data packet has been received by said client application.

2. The machine-readable device of claim 1, further comprising program code for, in response to a determination that said total number of lost data packets of said one or more data packets has exceeded said receiver loss tolerance value, sending a second acknowledgement indicating that said lost data packet has not been received by said client application.

3. The machine-readable device of claim 1, wherein said indication of a lost data packet is sent when a data packet is not received in sequence with a previously received data packet.

4. A method for managing transport of a data stream over a communication link from a sender to a client application, said method comprising:
    establishing said communication link for receiving said data stream having one or more data packets from said sender to said client application;
    dynamically determining, based on a determined reliability requirement of said client application within said communication link, a receiver loss tolerance value to be used for receiving said data stream by said client application, wherein said receiver loss tolerance value defines a second maximum number of data packets permitted to be lost over said communication link and still meets a predetermined reliability requirement without a retransmission of data packets over said communication link, wherein said receiver loss tolerance value is higher than a sender loss tolerance enforced by said sender, wherein said sender loss tolerance defines a first maximum number of data packets permitted to be lost over said communication link without a retransmission of data packets over said communication link;
    determining whether or not a total number of lost data packets of said one or more data packets has exceeded said receiver loss tolerance value, wherein said determining is based on a detection of a lost data packet of said one or more data packets during a transmission of said data stream, wherein said lost data packet is a data packet not received by said client application over said communication link; and
    in response to a determination that said total number of lost data packets of said one or more data packets has not exceeded said receiver loss tolerance value, sending by said client application a first acknowledgement signal to said sender for said sender to consider that said lost data packet has been received by said client application.

5. The method of claim 4, further comprising in response to a determination that said total number of lost data packets of said one or more data packets has exceeded said receiver loss tolerance value, sending a second acknowledgement indicating that said lost data packet has not been received by said client application.

6. The method of claim 4, further comprising sending said indication of a lost data packet when a data packet is not received in sequence with a previously received data packet.

\* \* \* \* \*